Nov. 24, 1964  D. J. MARSHALL  3,158,388
HOSE COUPLING CONNECTION
Filed July 13, 1962  4 Sheets-Sheet 1
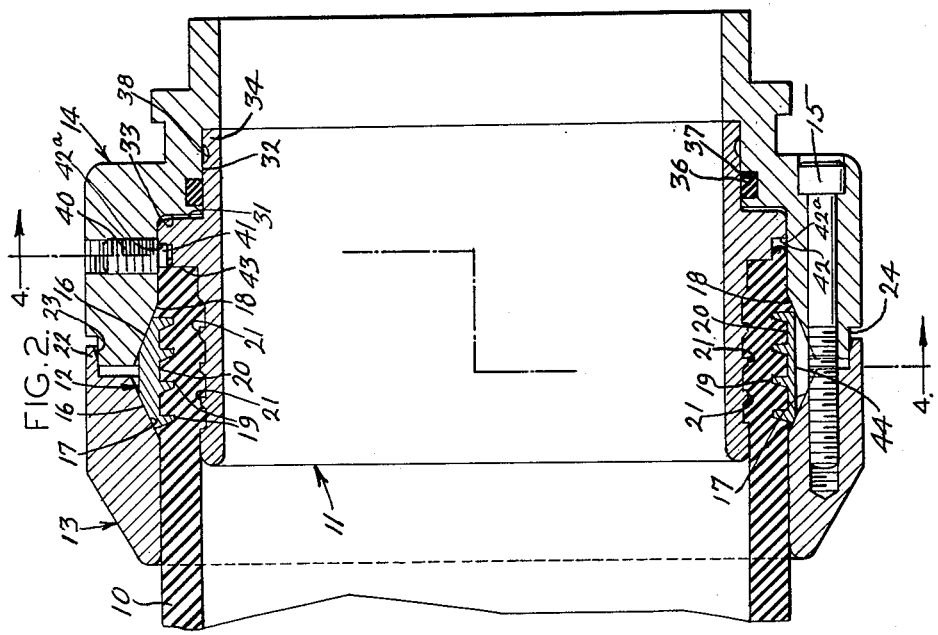
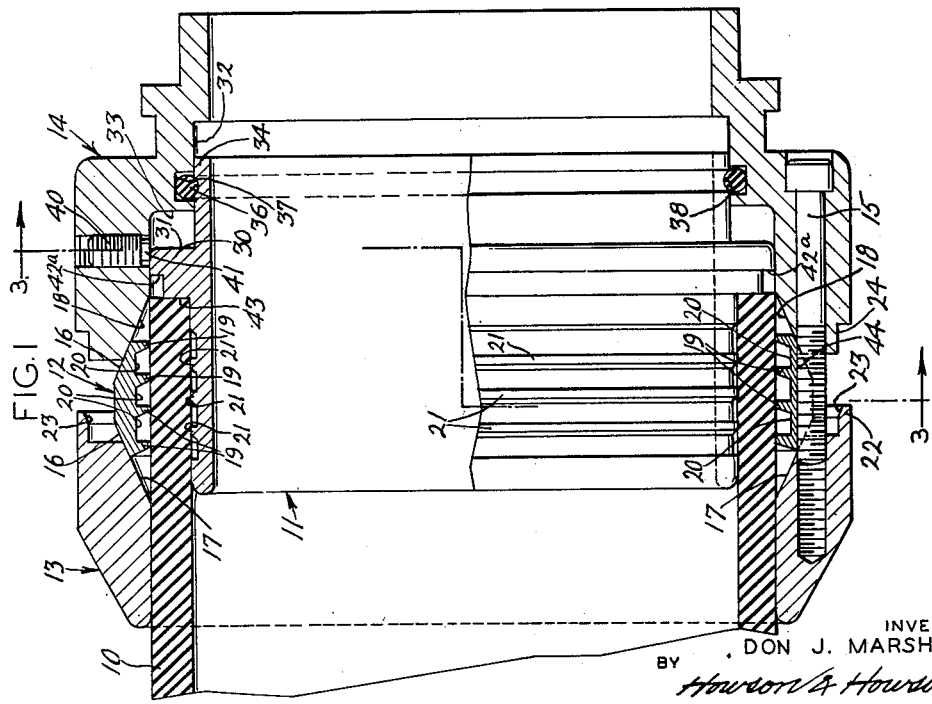
INVENTOR:
DON J. MARSHALL
BY
Howson & Howson
ATTYS Nov. 24, 1964  D. J. MARSHALL  3,158,388
HOSE COUPLING CONNECTION
Filed July 13, 1962  4 Sheets-Sheet 2

INVENTOR:
DON J. MARSHALL
BY Howson & Howson
ATTYS

Nov. 24, 1964 D. J. MARSHALL 3,158,388
HOSE COUPLING CONNECTION
Filed July 13, 1962 4 Sheets-Sheet 3

INVENTOR:
DON J. MARSHALL
BY Howson & Howson
ATTYS.

Nov. 24, 1964  D. J. MARSHALL  3,158,388
HOSE COUPLING CONNECTION
Filed July 13, 1962  4 Sheets-Sheet 4

INVENTOR:
DON J. MARSHALL
BY Howson & Howson
ATTYS.

United States Patent Office 3,158,388
Patented Nov. 24, 1964

3,158,388
HOSE COUPLING CONNECTION
Don J. Marshall, Edgewater, Md., assignor to Dixon Valve & Coupling Company, Philadelphia, Pa., a corporation of Pennsylvania
Filed July 13, 1962, Ser. No. 209,519
9 Claims. (Cl. 285—90)

This invention relates to a hose coupling connection, specifically to a coupling connection for a hose which is covered by elastomeric material such as rubber, and has for an object the provision of improvements in this art.

This application is a continuation-in-part of my co-pending application Serial No. 52,097, filed August 26, 1960, now abandoned.

The invention provides a coupling connection in which the hose-engaging elements are not subjected to either axial or circumferential forces tending to move them during the time they are being tightened on the hose. Consequently, there is substantially no scraping or scarfing effect on the hose and the rubber penetrating portions of the hose-engaging elements enter into the wall directly without shift in position after penetration and form a good seal therewith which is very effective in reducing corrosion and preventing leaks.

The invention also provides a coupling connection which is self-tightening as the hose wall thins with use and age and which can be retightened.

The invention also provides a coupling connection having a plurality of gripping wedge segments around the circumference in which the segments are held in evenly spaced position circumferentially in initial assembly and during at least the early stages of tightening to assure that the rubber flow during tightening will be even for each segment and even between all adjacent segments.

The invention also provides initial locating means for the parts to assure that the hose-engaging elements have the proper penetration and surface bearing for maximum efficiency of the connection when tightened for use.

The invention also provides means for sealing the end of the connection which is not sealed on the hose, this sealing means in at least some forms also serving as the initial positioning means for the parts.

The efficiency of a hose connection depends greatly on the percentage of applied force which can be utilized for tightening the connection and the efficiency is greatly reduced by the percentage of applied force which is lost in friction between parts, as for example, the turning of one part over another. The present invention provides a connection in which a very large percentage of the applied force is effective in making the connection with very little loss by friction. There are no parts which have any substantial relative turning movement.

The objects as well as various novel features and advantages of the invention will be apparent from the following description of certain exemplary embodiments thereof, reference being made to the accompanying drawings, wherein:

FIG. 1 is a longitudinal section through one form of connection embodying the invention, the view showing the position of parts before tightening;

FIG. 2 is a view like FIG. 1 but showing the position of parts after tightening;

Figure 3:
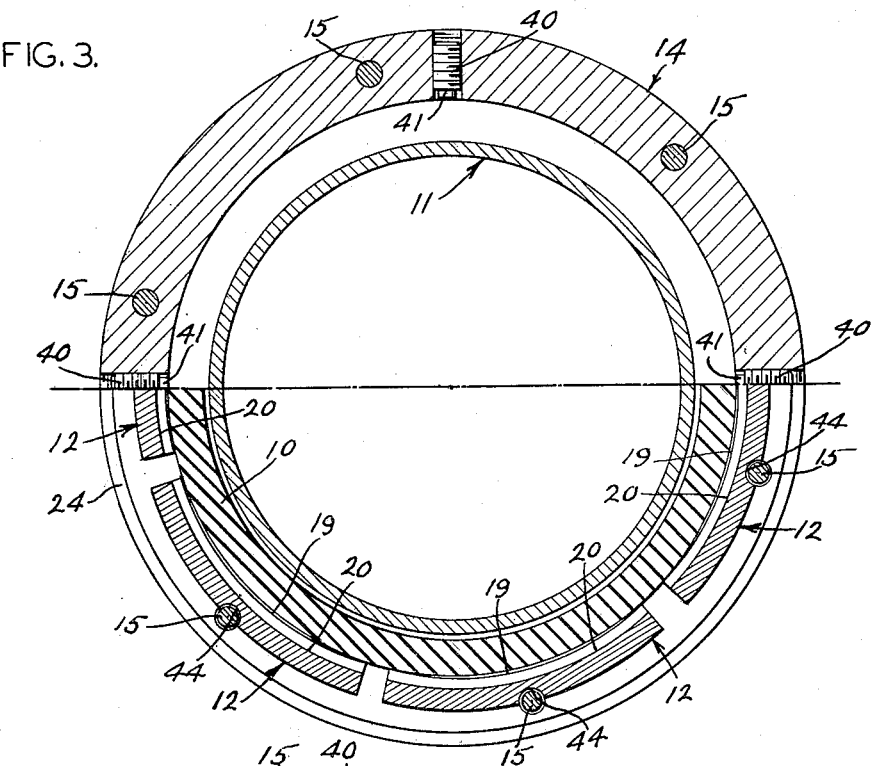
FIG. 3 is a transverse section taken on the line 3—3 of FIG. 1.
Figure 4:
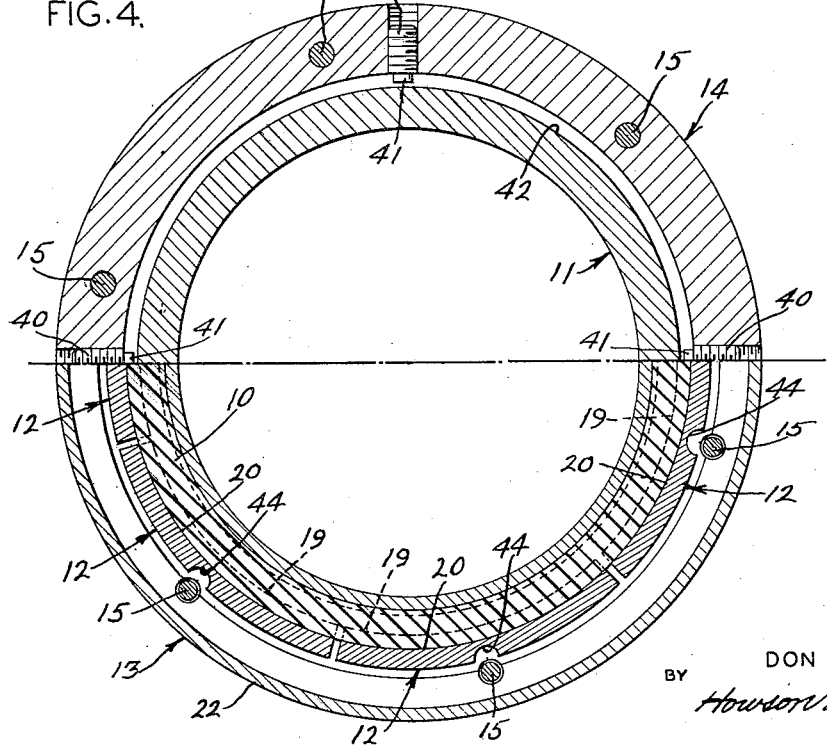
FIG. 4 is a transverse section taken on the line 4—4 of FIG. 2.
Figure 5:
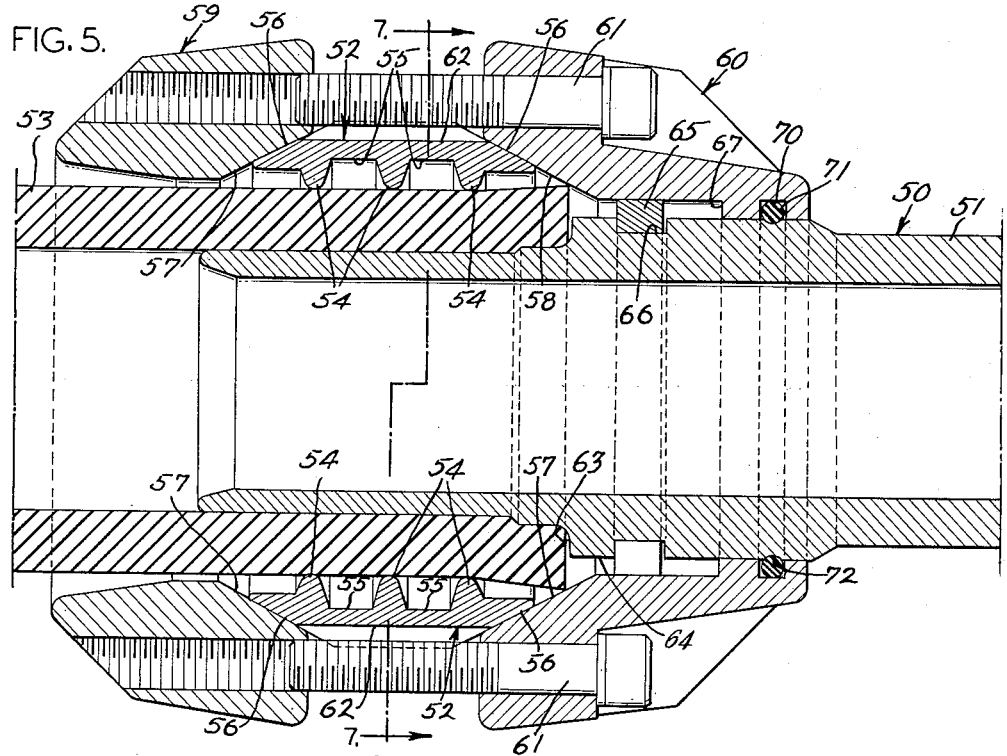
FIG. 5 is a longitudinal section through a modified form of connection, the parts being shown in the position before tightening.
Figure 6:
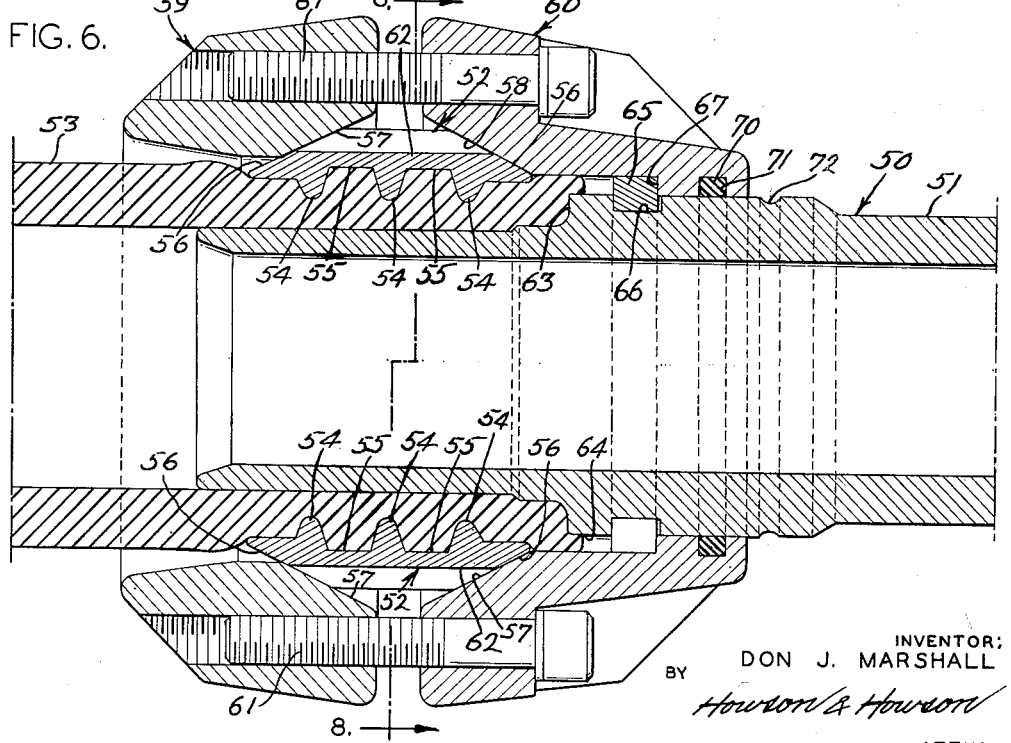
FIG. 6 is a view like FIG. 5 but showing the position of parts after tightening.
Figure 7:
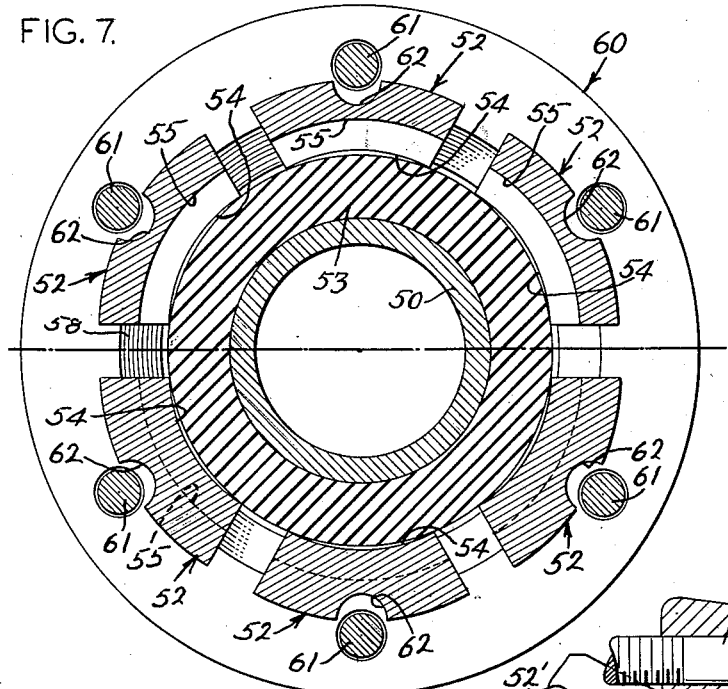
FIG. 7 is a transverse section taken on the line 7—7 of FIG. 5.

In the form shown in FIGS. 1 to 4 the end of the hose 10 is threaded or telescoped on the end of a nipple 11 and is secured thereon by a plurality of gripping wedges or wedge segments 12 of hard material which are squeezed inward evenly from both ends by clamp rings, collars or sleeves 13 and 14 which are evenly drawn together by a plurality of axially aligned clamp bolts 15.

The wedges 12 at each end are provided exteriorly with a tapered wedge surface 16 which mates with an interior tapered wedge surface 17 or 18 of the clamp rings 13 and 14 respectively.

The wedges, six in number here, are provided interiorly with circumferentially extending projections 19 of carefully calculated length and rounded ends to just fully enter the outer layer of rubber without cutting into the cord or wire reinforcement of the hose when the inner surfaces of the wedges are concentric and when the lands or stop surfaces 20 of the wedges are firmly seated on the outer surface of the rubber covering of the hose. The rounded ends avoid the start of break lines in the rubber.

The nipple may be smooth on its outer surface or it may have annular circumferential projections 21. The outer surface or land area is sufficient to initially support the inner surface of the hose and the spaced grooves receive material which is forced inward when the parts are tightened. If it does have such annular projections they are preferably spaced to lie longitudinally between the interior projections 19 of the wedges so that the rubber lining in the interior of the hose will be pressed down between the projections 21.

One of the clamp rings or collars, the outer ring 13 here, is provided exteriorly with a flange 22 having a tapered end 23 which is adapted to telescope on an annular surface 24 of the other ring 14 to guide the rings together at least toward the latter stages of tightening.

The nipple could be the principal load-carrying member of the connection but in the present form the inner ring is the principal load-carrying member which is adapted to be coupled to a suitable part which will be called an anchorage whether it be a like part of a hose coupling or an appropriate part of a tank outlet or the like.

The arrangement is such that when the clamp bolts are tightened with a torque wrench there can be assurance that the design strength and efficiency are realized since there is almost no energy loss in friction to take into account as there would be with the uncertain load required to turn relatively rotatable parts under variable friction. It is a practice to turn up the clamp bolts with a torque wrench to the required wrench loading, then to repeat this for a couple of times after a stabilizing period of a day or two until the connection attains a condition which is relatively stable. Later, after use and shrinkage the joint can be retightened.

The nipple 11 and the ring 14 are provided with means to limit their relative axial movement so that when they have been moved axially relative to each other by a predetermined limiting distance from a given starting position the calculated maximum strength or efficiency of the connection will not be impaired. As here shown, the nipple 11 is provided with an annular rib 30 having a radial stop surface 31 and the ring 14 is provided with an interiorly reduced portion 32 having a radial stop surface 33 which is adapted to engage the surface 31. The interior surface of the reduced portion 32 fits closely on the exterior surface of an inner extension 34 of the nipple.

The parts can be tightened beyond this position by the slight amount needed but only the outer clamp ring will move.

Means are provided for gaging the starting position of parts for a hose of predetermined wall thickness to provide that the connection has maximum strength or efficiency when the parts are fully tightened together. The means here shown comprises an O-ring 36, as of rubber or other elastic material, carried in an annular groove 37 of the reduced portion 32 of the ring 14 which initially engages in a shallow annular groove 38 of the nipple extension 34. In final position, FIG. 2, the O-ring 36 is squeezed down on the nipple extension 34 to provide a seal at the inner end of the connected parts. The rubber covering of the hose provides a seal at other parts of the connection—that is, it does if the rubber is not scarfed by improper movement of parts. The present invention assures that the rubber is not scarfed or marred in a way which would destroy the seal.

When pressure fluid is present in the hose it tends to force the hose out of its connection. In the present embodiment with the inner ring 14 connected to the anchorage, it will take this load; but the nipple will tend to move out with the hose since it is not connected to the anchorage. Means are provided for preventing the separation of the connection parts under this loading. The means here shown comprises a plurality of screws 40 threaded in the sleeve 14 which are turned in after the parts have been tightened to engage their inner ends 41 behind a radial annular surface 42 formed on the rib 30 of the nipple. An annular radial surface 43 of the rib 30 serves as a stop for the inner end face or wall of the hose and an annular recess 42a provides space into which material of the hose is squeezed in tightening.

Means are provided for holding the wedges or gripping segments accurately in circumferential position, at least during initial positioning, so the wedges will be equally spaced apart circumferentially at the start of tightening and will have the same amount of rubber squeezed between them when fully tightened. Also their inner surfaces will be concentric. As here shown, this means comprises axial notches or grooves 44 formed in the backs of the wedges in which are engaged the sides of the bolts 15. The notches thin the wedges somewhat and impart a slight bending action which makes the wedges seat better with the tapered surfaces of the rings 13 and 14.

In the form shown in FIGS. 5 to 8 the nipple 50 includes a body extension 51 which is adapted to be secured to a suitable anchorage, in which case the nipple becomes the principal load-carrying member of the connection. The hose-engaging end of the nipple may be provided with annular grooves as before, if desired, but may be smooth, as shown. In either case the inner surface of the hose is inserted over the maximum diameter of the nipple because the high pressure hose with which the present invention is concerned, especially the wire-reinforced hose for extremely high pressures, does not provide much expansion for yielding to pass over nipple diameters which are greater than the inner diameter of the hose. Therefore, whether smooth or with grooves, the outer diameter surface of the nipple will be the principal bearing surface for the hose and have the major hose-supporting area.

Wedge segments 52, again six in number and of hard material, are provided for gripping the hose 53 to the outer end of the nipple. The wedge segments have axially spaced circumferentially extending round-ended projections 54 for penetrating the outer rubber layer of the hose to a predetermined depth and stop land surfaces 55 for engaging the outer surface of the hose to limit the depth of penetration.

The wedges have tapered surfaces 56 at both ends for engagement by the tapered surfaces 57 and 58 of companion clamp rings 59 and 60 which are drawn together by a plurality of axially aligned clamp bolts 61. In initial pre-tightened position the bolts 61 fit in notches 62 in the backs of the wedges to hold them accurately in proper initial position.

The nipple is provided with an annular radial face 63 which is engaged by the end face of the hose. The outer surface 64 of the nipple and the inner surface of the clamp ring 60 are spaced apart for a distance behind the face 63 to receive some of the rubber which is squeezed out axially when the hose is gripped.

Means are provided for taking the axial loading imposed when pressure fluid is present in the hose, the means here shown comprising a locking ring 65 which has a transverse split which is positioned in an annular groove 66 in one of the adjacent parts, here in the nipple, which engages an annular radial shoulder 67 of the other part, the ring or collar 60 here, when the parts are fully tightened together.

Means are provided for gaging the initial position of parts so that they will be in designed position when fully tightened, the means here, as before, comprising an O-ring 70 carried in a groove 71 of the ring 60 which initially engages in a shallow groove 72 in the nipple and which in final position is squeezed against the surface of the nipple to provide a good seal for the inner end of the connection.

Figure 9:
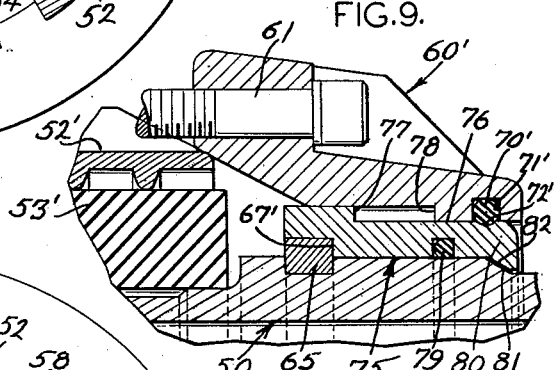
FIG. 9 is a partial longitudinal section of a modification comprising an adapter for hose of greater wall thickness.
Figure 8:
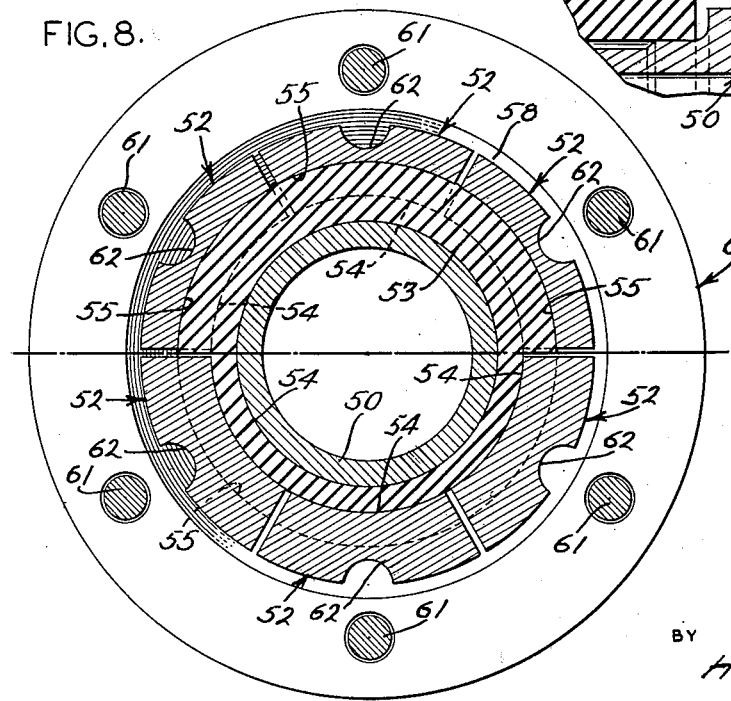
FIG. 8 is a transverse section taken on the line 8—8 of FIG. 6.

FIG. 9 shows essentially the same form of connection as that of FIGS. 5 to 8 but adapted to take a hose 53' having a thicker wall. Here an adapter ring 75 engages the split locking ring 65 and is provided with an outer surface 76 for an oversized clamp ring 60'. A mating oversized clamping ring (not shown) and oversized (longer circumferentially) wedges 52' complete the assembly. O-rings 70' carried in a groove 71' of the clamp ring 60' and initially engaging in a shallow gage groove 72' of the adapter ring provide for gaging and sealing. Mating radial stop faces 77, 78 on the adapter ring 75 and clamp ring 60' respectively limit the final tightened position of parts. A radial surface or shoulder 67' of the adapter engages the locking ring 65 and an O-ring 79 provides a seal between the adapter ring 75 and the outer surface of the nipple 50. An interior end flange 80 of the adapter ring 75 has a tapered surface 81 which overlies a tapered shoulder 82 of the nipple to supplement the holding function of the split locking ring 65.

The order of assembly of the parts should be apparent from the foregoing description. In the first form of FIGS. 1 to 4 the O-ring 36 is inserted in the groove 37 of the clamp ring 14 and the inner end 34 of the nipple 11 is pushed in until its groove 38 engages the O-ring 36. The end of the hose is next telescoped over the outer end of the nipple until the end wall of the hose abuts the radial face 43 of the nipple. Next the bolts 15 are inserted in the clamp ring 14 and the wedge segments 12 are pushed in with their back grooves or notches 44 embracing the bolts. The outer clamp ring 13 is then pushed in over the outer end of the wedge segments and the bolts or screws 15 turned in the threaded holes in the ring 13 to tighten the clamp rings on the wedge segments and thereby tighten the wedge segments on the hose. The wedges have no axial or circumferential movement during the tightening action. During tightening the O-ring 36 moves out of the shallow gaging groove 38 and seals against the extension 34 of the nipple. After tightening the lock screws 40 are turned in to hold the nipple 11 and clamp ring 14 together.

In the form shown in FIGS. 5 to 8 the split locking ring 65 is placed in the groove 66 of the nipple, the O-ring 70 is put in the groove 71 of the clamp ring 60 and the parts telescoped until the O-ring 70 seats in the shallow gaging groove 72. The hose is then telescoped on the nipple and the bolts 61, clamp segments and outer clamp ring 59 put on as before. Locking screws are not needed because the nipple carries the coupling loading.

The assembly of the FIG. 9 modification will be obvious from the assembly of the form of FIGS. 5–8.

In all forms there are the following elements which combined produce an improved and more efficient hose connection:

(1) A plurality of hose gripping segments, at least four in number, to avoid tangential movement along the circumference of the hose to avoid scarfing during tightening.

(2) Gripping segments tapered on both ends to avoid all axial movement during tightening thereby avoiding scarfing the hose in an axial direction.

(3) Means to hold the gripping segments accurately in evenly spaced circumferential initial position until set into the hose so that the same amount of gripping will be performed by each segment and so the same amount of rubber will be forced into all spaces between segments.

(4) Axially spaced circumferentially extending projections of predetermined radial height on the gripping segments for proper penetration of the rubber together with broad stop land surfaces at the root end of the projections to engage and stop on the outer surface of the hose.

(5) Freedom from relative circumferential movement of parts during tightening so as to avoid displacement of parts and to assure maximum efficiency in the use of force applied in making the connection. Only axial and radial movements are involved in tightening.

(6) Axial limit stop means, specifically including a split locking ring between relatively axially movable parts.

(7) Gage means to establish initial tightening position, specifically an O-ring in initially facing grooves which later serves as a sealing ring.

(8) A self-locking effect as the hose is urged outward by internal fluid pressure, the outer tapered surfaces of the gripping segments by engagement with the tapered surface of the outer clamping ring serving to force the gripping segments radially inward.

(9) Material at the end of the hose squeezed into an annular space provided therefor to form a seal, the projections of the wedge segments having a carefully calculated spacing and length to force the hose material into this space.

(10) The connection is reusable, reattachable, manually and automatically retensioning, which may be employed upon any hose carcass without scarfing (removing) either the outer cover or the inner lining of the hose.

(11) A full circumferential axial extension of the inner clamp ring above the seal with the nipple extension to provide an effective seal which cannot be spread radially by the extremely high internal fluid pressure which must be contained, pressures which modern reinforced high pressure hose must be designed to withstand up to 10,000 p.s.i. or more.

(12) The tapered surfaces of the wedge segments and clamping rings which cooperate therewith are uninterrupted, that is, free from stop ribs or the like, which would halt the full relative axial movement needed to provide full relative movement throughout the desired tightening range.

(13) The full ring extension of the inner clamping ring strongly embraces the reaction elements which are provided to take the axial loads caused by high internal fluid pressure.

It is thus seen that the invention provides a unique combination of elements which together provide a hose connection of a greatly improved and more efficient character.

While certain embodiments of the invention have been described for purposes of illustration, it is to be understood that there may be various embodiments and modifications within the scope of the invention.

I claim:

1. A hose coupling connection for a hose having an elastomeric outer covering, comprising in combination, a nipple having a cylindrical hose-supporting surface terminating in a radial annular surface engaged by the end wall of the hose when assembled, a plurality of, and at least four, circumferentially spaced hard rigid gripping wedge segments disposed around the outer periphery of the hose when the hose is telescoped on the nipple, said wedge segments having interior axially-spaced circumferentially extending projections with rounded interior ends for engaging and penetrating the covering of the hose and also having broad intermediate land surfaces between the projections which engage the outer surface of the covering when the projections have penetrated into the covering, said wedge segments having axially oppositely directed axially continuous tapered wedge surfaces on the exterior side free from exterior projections at the adjacent high ends which would interfere with the full passage thereover of clamping means, said wedge segments by cam action exerted on their tapered wedge surfaces from opposite axial direction having their interior projections forced into the covering of the hose, means for clamping and holding said wedge segments in engagement with the hose, said clamping means including axially opposed clamping rings having annular wedge-shaped interior surfaces engaging the tapered outer wedge surfaces of said wedge segments, and one of said clamping rings having a circumferentially complete annular ring extension overlying an axial extension of said nipple located beyond the end of the hose, said ring and nipple extensions embracing reaction elements for taking axial reaction forces between them tending to separate them axially due to internal fluid pressure, said clamping rings at their axially remote ends completely embracing and extending beyond the remote ends of said wedge segments, axially aligned circumferentially spaced clamping elements between said clamping rings disposed radially outside said wedge segments for pulling said clamping rings together, and means for holding said wedge segments in evenly spaced position circumferentially of the hose until the projections of the segments penetrate into the outer surface of the hose, said wedge segment positioning means comprising cooperating portions of said wedge segments and said axially aligned ring clamping elements which separate radially as the connection is tightened on the hose.

2. A hose coupling connection for a hose having an elastomeric outer covering, comprising in combination, a nipple having a cylindrical hose-supporting surface terminating in a radial annular surface for engagement by the end wall of the hose, a plurality of, and at least four, circumferentially spaced hard, rigid gripping wedge segments disposed around the outer periphery of the hose when the hose is telescoped on the nipple, said wedge segments having interior axially-spaced circumferentially-extending projections with rounded interior ends for engaging and penetrating the covering of the hose and also having broad intermediate land surfaces between the projections which engage the outer surface of the covering when the projections have penetrated into the covering, said wedge segments having axially oppositely directed axially continuous tapered wedge surfaces on the exterior surface free from exterior projections at the adjacent high ends which would interfere with the full passage thereover of clamping means, axially spaced clamp wedge rings having interior tapered surfaces which engage the tapered surfaces of the wedge segments and by axial movement toward each other and the wedge action of the interengaging tapered surfaces force said wedge segments radially inward to cause their projections to penetrate the hose covering and their lands to grip the hose, all by axial and radial movements of parts and without relative circumferential movements of parts and without tangential scarfing or scraping action of the wedge segments on the covering of the hose, and means for clamping and holding said wedge segments radially inward in gripping relationship with said hose by axial movement of said wedge rings toward each other, said clamping and holding means including a plurality of circumferentially spaced axially aligned clamp bolts arranged between said wedge rings, and each of said clamp segments having means on its back surface which initially engages with said clamp bolts to hold the wedge segments in accurately spaced initial position and having radial movement relative to the bolts as the wedge segments move inward, one of said clamping rings having a circumferentially complete annular ring extension overlying an axial extension of said nipple located beyond the end of the hose, said ring and nipple extensions embracing reaction elements for taking axial reaction forces between them tending to separate them axially due to internal fluid pressure said clamping rings at their axially outer ends completely embracing and extending beyond the remote ends of said wedge segments.

3. A hose coupling connection for a hose having an elastomeric outer covering, comprising in combination, a nipple having a cylindrical hose-supporting surface terminating in a radial annular surface for engagement by the end wall of the hose, a plurality of, and at least four, circumferentially spaced hard, rigid gripping wedge segments disposed around the outer periphery of the hose when the hose is telescoped on the nipple, said wedge segments having interior axially-spaced circumferentially-extending projections with rounded interior ends for engaging and penetrating the covering of the hose and also having broad intermediate land surfaces between the projections which engage the outer surface of the covering when the projections have penetrated into the covering, said wedge segments having axially oppositely directed axially continuous tapered wedge surfaces on the exterior surface free from exterior projections at the adjacent high ends which would interfere with the full passage thereover of clamping means, axially spaced clamp wedge rings having interior tapered surfaces which engage the tapered surfaces of the wedge segments and by axial movement toward each other and the wedge action of the interengaging tapered surfaces force said wedge segments radially inward to cause their projections to penetrate the hose covering and their lands to grip the hose, all by axial and radial movements of parts and without relative circumferential movements of parts and without tangential scarfing or scraping action of the wedge segments on the covering of the hose, and means for clamping and holding said wedge segments radially inward in gripping relationship with said hose by axial movement of said wedge rings toward each other, said clamping and holding means including a plurality of circumferentially spaced axially aligned clamp bolts arranged between said wedge rings, and each of said clamp segments having means on its back surface which initially engages with said clamp bolts to hold the wedge segments in accurately spaced initial position and having radial movement relative to the bolts as the wedge segments move inward, one of said clamping rings having a circumferentially complete annular ring extension overlying an axial extension of said nipple located beyond the end of the hose, said ring and nipple extensions embracing reaction elements for taking axial reaction forces between them tending to separate them axially due to internal fluid pressure, said clamping rings at their axially remote ends completely embracing and extending beyond the remote ends of said wedge segments, and means for holding said nipple, wedge segments, and hose against axial separation when pressure is applied interiorly of the hose, said holding means including means interengaged between said nipple and a portion of one of said clamp rings which is located beyond the end of said hose.

4. A hose coupling connection as set forth in claim 3, in which said means for holding said parts against axial separation comprises circumferentially spaced screws in said inner clamping ring which are screwed in to engage behind an annular radial surface on said nipple after the parts have been tightened on the hose.

5. A hose coupling connection as set forth in claim 3, in which said means for holding said parts against axial separation comprises an annular resilient locking ring which engages annular radial surfaces on said nipple and clamping ring after the parts have been tightened on the hose.

6. A hose coupling connection for a hose having an elastomeric covering, comprising in combination, a nipple having a cylindrical hose-supporting surface terminating in an annular radial surface engaged by the end wall of the hose when assembled, a plurality of, and at least four, circumferentially spaced gripping wedge segments disposed around the outer periphery of the hose when the hose is telescoped on the cylindrical surface of the nipple, said wedge segments having hard inwardly extending projections for engaging and penetrating the covering of the hose when the wedge segments are clamped thereon, said wedge segments having axially opposed tapered wedge surfaces on the exterior side rising in height toward an intermediate portion of their length, axially spaced clamping rings surrounding said wedge segments and having axially opposed tapered interior wedge surfaces engaging the outer tapered wedge surfaces of said wedge segments, axially extending rod-like members between said clamping rings for pulling them together on said wedge segments, and elements on the medial-length exterior side of said wedge segments which engage said rod-like members and hold said wedge segments in proper circumferential position in initial assembly position and which move radially inward away from said rod-like members as the connection is tightened on the hose.

7. A hose coupling connection for a hose having an elastomeric outer covering, comprising in combination, a nipple having a cylindrical hose-supporting surface, radially movable wedge-back hose-engaging means for gripping the hose on the nipple, axially movable wedge clamp ring means for engaging said radially movable wedge-back hose-engaging means for clamping it on the hose, and initial positioning means between said nipple outside the cylindrical hose-supporting surface and said wedge clamp ring means for holding the clamp means in a predetermined axial initial position before tightening, said initial positioning means comprising an O-ring seal disposed in a relatively deep carrying groove in one part and in initial position engaging a relatively shallow groove in the other part, said O-ring seal in the tightening action moving axially to move out of said shallow groove and sealingly engaging a higher surface of said other part when the connection is tightened.

8. A hose coupling connection, comprising in combination, a nipple having a cylindrical portion fitting inside the end of a hose and an enlarged portion having a radial annular surface for engagement by the end wall of the hose, a plurality of wedge segments surrounding the end of the hose over the cylindrical portion of the nipple, said wedge segments having exterior tapered wedging surfaces, axially movable clamp rings having interior tapered wedging surfaces surrounding the tapered wedging surfaces of the wedge segments, the inner one of said clamp rings completely embracing the inner ends of said wedge segments and having an annular axially projection extending therebeyond to surround the enlarged portion of said nipple, an adapter ring surrounding the enlarged portion of the nipple within said annular axial projecting portion of said inner clamping ring, an annular sealing ring and a locking ring between said adapter ring and the enlarged portion of the nipple, a sealing ring between the outer surface of said adapter ring and the inner one of said clamp rings, and radially overlapping radial stop faces on the outer side of the adapter ring and said one of the clamp rings.

9. A hose coupling connection as set forth in claim 8, in which the sealing ring between the adapter ring and said one clamp ring is provided with a carrying groove in one ring part and a relatively shallow groove in the other ring part, the sealing ring occupying the shallow groove in initial position when said radial stop faces are spaced apart to establish an inital holding gaging position of parts.

References Cited in the file of this patent

UNITED STATES PATENTS

| | | |
|---|---|---|
| 738,503 | Waters | Sept. 8, 1903 |
| 1,016,620 | Gapp | Feb. 6, 1912 |
| 1,117,856 | Kent | Nov. 17, 1914 |
| 1,186,324 | Metzger | June 6, 1916 |
| 1,401,765 | Davis | Dec. 27, 1921 |
| 1,675,808 | Kliss | July 3, 1928 |
| 1,726,808 | Cox | Sept. 3, 1929 |
| 1,887,877 | Shaffer | Nov. 15, 1932 |
| 2,299,171 | Muller | Oct. 20, 1942 |
| 2,328,298 | Santhoff | Aug. 31, 1943 |
| 2,460,653 | Raybould | Feb. 1, 1949 |

FOREIGN PATENTS

| | | |
|---|---|---|
| 564,619 | France | Oct. 24, 1923 |
| 1,240,398 | France | July 25, 1960 |
| 7,967 | Great Britain | Apr. 6, 1903 |